(12) United States Patent
Yi et al.

(10) Patent No.: US 7,312,094 B2
(45) Date of Patent: Dec. 25, 2007

(54) PRINTING SYSTEM AND METHOD FOR FABRICATING A LIQUID CRYSTAL DISPLAY DEVICE

(75) Inventors: Jong-Hoon Yi, Seoul (KR); Dong-Hoon Lee, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 407 days.

(21) Appl. No.: 11/004,833

(22) Filed: Dec. 7, 2004

(65) Prior Publication Data

US 2005/0092712 A1    May 5, 2005

Related U.S. Application Data

(62) Division of application No. 10/183,480, filed on Jun. 28, 2002, now Pat. No. 6,835,583.

(30) Foreign Application Priority Data

Oct. 30, 2001    (KR) ................ 2001-67236

(51) Int. Cl.
*H01L 21/00* (2006.01)
*B41F 1/18* (2006.01)

(52) U.S. Cl. .............. 438/30; 438/778; 438/780; 101/425; 101/450.1

(58) Field of Classification Search ............ 438/30, 438/778, 779, 780; 101/425, 450.1, 153, 101/170, 423, 424
See application file for complete search history.

(56) References Cited

U.S. PATENT DOCUMENTS

| | | | | |
|---|---|---|---|---|
| 5,259,926 A | * | 11/1993 | Kuwabara et al. | .......... 438/689 |
| 5,678,483 A | | 10/1997 | Johnson | |
| 5,860,361 A | * | 1/1999 | Nanjyo et al. | .............. 101/424 |
| 6,001,515 A | | 12/1999 | Evans et al. | |
| 6,234,080 B1 | * | 5/2001 | Tani | ........................... 101/424 |
| 6,279,590 B1 | * | 8/2001 | Okuda et al. | ............... 134/186 |
| 6,730,356 B2 | | 5/2004 | Kim et al. | |
| 6,732,643 B2 | | 5/2004 | Kwon et al. | |
| 6,759,348 B1 | | 7/2004 | Cho et al. | |

* cited by examiner

*Primary Examiner*—Kevin M. Picardat
(74) *Attorney, Agent, or Firm*—Morgan, Lewis & Bockius LLP

(57) ABSTRACT

A printing system for printing a pattern onto a liquid crystal display device includes a cliché having a plurality of grooves defining a pattern, a blade for filling a material into each of the plurality of grooves of the cliché, a clean chamber for cleaning the cliché, and an actuator disposed within an interior of the clean chamber upon which the cliché is placed.

5 Claims, 8 Drawing Sheets

PRINTING SYSTEM AND METHOD FOR FABRICATING A LIQUID CRYSTAL DISPLAY DEVICE

This is a divisional of application Ser. No. 10/183,480, filed on Jun. 28, 2002 now U.S. Pat. No. 6,835,583.

The present invention claims the benefit of Korean Patent Application No 67236/2001 filed in Korea on Oct. 30, 2001, which is hereby incorporated by reference.

BACKGROUND OF THE INVENTION

1. Field of the Invention

The present invention relates to a printing system and method used for fabricating a liquid crystal display device, and more particularly, to a printing system and printing method for fabricating a thin film transistor, a color filter, and a black matrix of a liquid crystal display device.

2. Description of the Related Art

In general, cathode ray tube (CRT) monitors are commonly used to display information on a computer displays and televisions because of the CRT monitor's superior picture quality and image brightness. However, as demand for larger displays increases, the size of the CRT monitors also increases. Accordingly, the overall size of the CRT monitor eventually increases to a point where it's size is too large to efficiently display image data. In addition, mobility of the CRT monitor decreases as overall weight of the CRT monitor increases.

Presently, flat type display devices, such as liquid crystal displays (LCD's), plasma display panel (PDP) displays, organic electro luminescence (EL) displays, light emitting diodes (LEDs), and field emission displays have gained in popularity. Among the different flat panel display devices, liquid crystal display (LCD) devices have been developed as monitors for laptop and desktop computers because or their low power consumption.

FIG. 1 is a cross-sectional view of an LCD device panel according to the conventional art. In FIG. 1, the LCD device panel is formed of a lower substrate and an upper substrate. The upper substrate includes a glass substrate 10 having a color filter layer 11, a black matrix 12, an orientation layer 14, and a common electrode 13. Both the black matrix 12 and the color filter layer 11 are formed on the glass substrate 10, wherein the black matrix 12 is disposed between adjacent color filter layers 11. The color filter layer 11 includes a resin film containing dye or three basic colors of red, green, and blue or a pigment thereof. An overcoat film (not shown) is provided for smoothing the color filter layer 11 and improving an adhesive force with the common electrode 13, which is commonly formed or a transparent conductive material, such as indium tin oxide (ITO). The orientation layer 14 aligns a liquid crystal material formed between the upper and lower substrates.

In FIG. 1, the lower substrate includes a glass substrate 10 having a thin film transistor (TFT) formed thereon, a protection film 20, a pixel electrode 21, and an orientation layer 14. The TFT includes a gate electrode 15, an active layer 16, a source electrode 18, and a drain electrode 19. The gate electrode 15 is formed on the glass substrate 10 with a gate insulating layer 17 formed on the gate electrode 15 and the glass substrate 10. The active layer 16 includes a semiconductor layer 16a formed by depositing an amorphous silicon (a-Si) and a n+ doped ohmic contact layer 16b at opposing upper portions of the semiconductor layer 16a. The protection film 20 is formed to cover the TFT and the gate insulating film 17. The pixel electrode 21 is formed on the protection film 20 and is formed of a transparent conductive material, such ITO. The orientation layer 14 is formed on the pixel electrode 21 and the protection film 20. Polarizing films 22 are disposed on the outside surfaces of the upper and lower substrate respectively.

In FIG. 1, light transmittance through the liquid crystal layer formed between the upper and lower substrates is controlled by application of an electric potential on the common electrode 13 and the pixel electrode 21. The common electrode 13 commonly receives a constant potential, whereas the pixel electrode 21 receives a data signal to generate the electric field. The pixel electrode 21 receives the data signal when the TFT is turned on. Specifically, a data signal is supplied to the source electrode 18 of the TFT and is transmitted via the active layer 16a through the ohmic contact layer 16b when the gate electrode 15 is enabled by receiving a scan signal. Accordingly, the data signal is transmitted to the drain electrode 19 and applied to the pixel electrode 21, thereby generating the electric field in combination with the common electrode 13 and controlling the light transmitted through the liquid crystal layer.

Fabrication of the LCD device commonly includes a thin film deposition process, a photolithographic process, and an etching process that are repeatedly performed. Moreover, fabrication of the TFT, the color filter layer 11, and the black matrix 12 includes sequential printing processes of ink or photoresist materials. The printing processes include a gravure offset method and a transfer method depending upon how the photoresist material is applied to the upper and lower substrates. The gravure offset method includes steps of filling the photoresist material into a groove of a cliché, transferring the photoresist material filled in the groove onto a roller; and applying the transferred photoresist material onto the upper or lower substrate, FIGS. 2A to 2D are cross-sectional views of a sequential printing process according to a gravure of offset printing method according to the conventional art. In FIG. 2A, a photoresist or ink material 29 is filled into a plurality of rectangular grooves 26 formed in a surface of a cliché, wherein the plurality of rectangular grooves are spaced apart to define a pattern. Next, any excess photoresist material 29 that remains on the surface of the cliché is removed by a doctor blade 27. Accordingly, the photoresist material 29 only remains in each of the plurality of rectangular grooves 26.

In FIG. 2B, a roller 25 is rolled across the surface of the cliché along a first direction so that individual photoresist material portions 24 of the photoresist material 29 (in FIG. 2A) that filled each of the plurality of rectangular grooves 26 (in FIG. 2A) are temporarily bonded onto a blanket 28 of the roller 25. Accordingly, the pattern of the photoresist-filled rectangular grooves 26 (in FIG. 2A) is transferred onto the blanket 28 as the individual photoresist material portions 24.

In FIG. 2C, the roller 25 is placed above a substrate 10 and the individual photoresist material portions 24 are transferred onto a surface of the substrate 10 corresponding to the pattern of the photoresist-filled rectangular grooves 26 (in FIG. 2A). The substrate 10 may be formed of a glass or plastic substrate material.

In FIG. 2D, the individual photoresist material portions 24 are completely transferred to the surface of the substrate 10, and the printing process is completed. Thus, the pattern of the grooves 26 (in FIG. 2A) is replicated onto the surface of the substrate 10.

FIGS. 3A to 3D are cross-sectional views of a sequential printing process according to a transfer method according to the conventional art. In FIG. 3A, a photoresist or ink material 29 is filled into a plurality of rectangular grooves 26 formed in a surface of a cliché, wherein the plurality of rectangular grooves are spaced apart to define a pattern. Next, any excess photoresist material 29 that remains on the surface of the cliché is removed by a doctor blade 27. Accordingly, the photoresist material 29 only remains in each of the plurality of rectangular grooves 26.

In FIG. 3B, a surface of a substrate 10, which may be formed of a glass or plastic material, is placed upon the surface of the cliché to contact uppermost surfaces of individual photoresist material portions 24 filled in each or plurality of rectangular grooves 26 (in FIG. 3A). Then, heat and/or pressure is applied to the substrate 10 and cliché to bond each of the individual photoresist material portions 24 onto the surface of the substrate 10. Accordingly, the pattern of the photoresist-filled rectangular grooves 26 (in FIG. 3A) is transferred onto the surface of the substrate 10 blanket 29 as the individual photoresist material portions 24.

In FIG. 3C, the substrate 10 is removed from the surface of the cliché, and the individual photoresist material portions 24 are transferred from the plurality of rectangular grooves 26 (in FIG. 3A) onto the surface of the substrate 10, thereby completing the printing process for forming the pattern.

In FIG. 3D, the substrate 10 is delivered to a position in which the individual photoresist material portions 24 are prepared for additional processing.

However, both the gravue and transfer printing methods according to the conventional art are problematic. Since the cliché is exposed to an ambient atmosphere in the gravue and transfer printing methods according to the conventional art, the cliché may become contaminated, thus causing contamination of the substrate 10 and possibly disrupting transfer of the photoresist pattern onto the substrate 10.

SUMMARY OF THE INVENTION

Accordingly, the present invention is directed to a printing system and method for fabricating a liquid crystal display device that substantially obviates one or more of the problems due to limitations and disadvantages of the related art.

An object of the present invention is to provide a printing system and method for fabricating a liquid crystal display device that reduces contamination of a photoresist pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a printing system for printing a pattern onto a liquid crystal display device includes a cliché having a plurality or grooves defining a pattern, a blade for filling a material into each of the plurality of grooves of the cliché, a clean chamber for cleaning the cliché, and an actuator disposed within an interior of the clean chamber upon which the cliché is placed.

In another aspect, a printing method of forming a printing pattern of a liquid crystal display device includes ascending a cliché from a first position within an interior of a clean chamber, introducing a material into a plurality of grooves of the cliché, removing the material from a surface of the cliché using a blade, transferring the material from the plurality of grooves onto a roller, and applying the transferred material onto a substrate.

In another aspect, a printing method of forming a printing pattern of a liquid crystal display device includes ascending a cliché from a first position within an interior of a clean chamber, introducing a material into a plurality of grooves of the cliché removing the material from a surface of the cliché using a blade, attaching a first surface of a substrate onto an uppermost surface of the cliché for transferring the material from the plurality of grooves onto the first surface of the substrate, and removing the substrate from the uppermost surface or the cliché.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 6A to 6H are cross-sectional views of an exemplary sequential printing process or a gravure offset method in accordance with the present invention.

DETAILED DESCRIPTION OF THE PREFERRED EMBODIMENTS

Reference will now be made in detail to the preferred embodiments of the present invention, examples of which are illustrated in the accompanying drawings.

Although the following description refers to a photoresist or ink materials in general, it is to be understood that the photoresist or ink materials may be used to during fabrication processes for forming a thin film transistor, a color filter, and a black matrix of a liquid crystal display device. Likewise, it is to be understood that the following processes may used to fabricate a thin film transistor, a color filter, and a black matrix of a liquid crystal display device.

Figure 1:
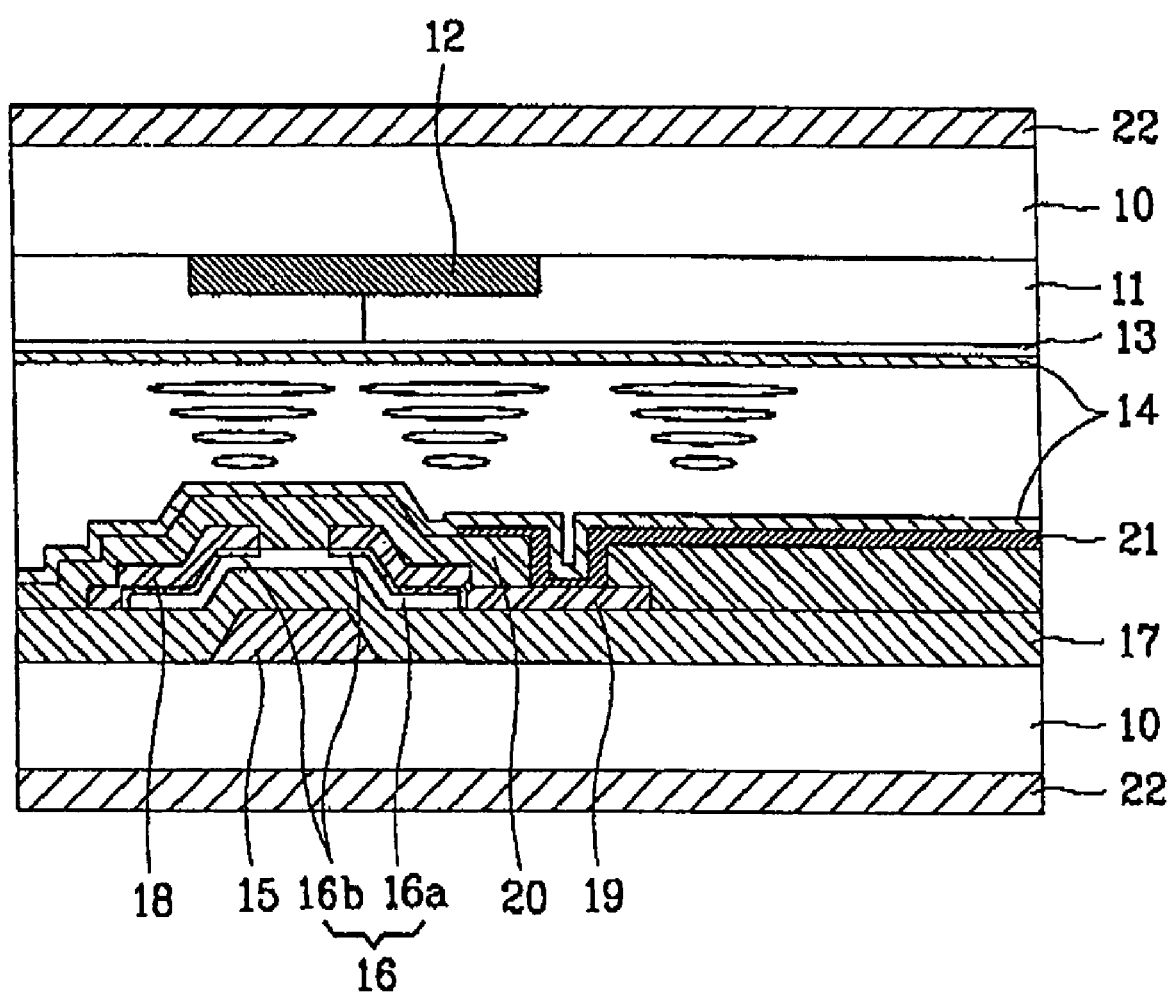
FIG. 1 is a cross-sectional view of a liquid crystal display device panel according to the conventional art.
Figure 2A:
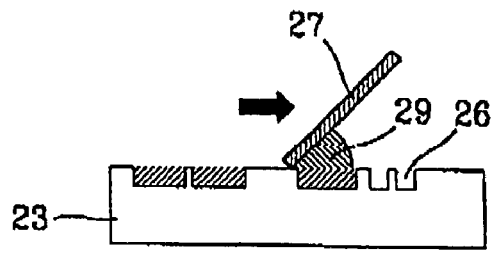
FIGS. 2A to 2D are cross-sectional views of a sequential printing process according to a gravure offset method according to the conventional art.
Figure 2B:
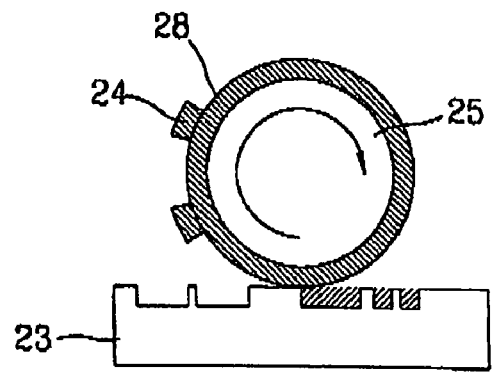
Figure 2C:
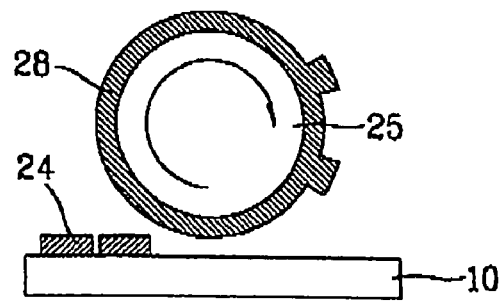
Figure 2D:
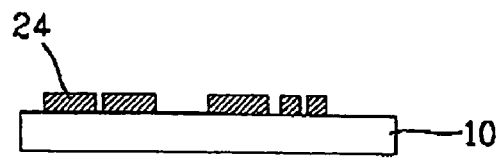
Figure 3A:
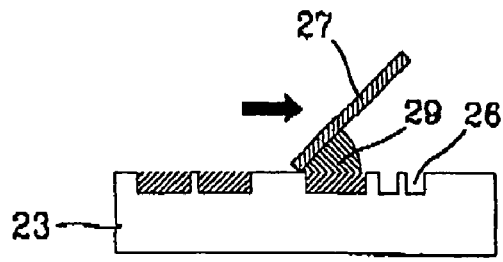
FIGS. 3A to 3D are cross-sectional views of a sequential printing process according to a transfer method according to the conventional art.
Figure 3B:
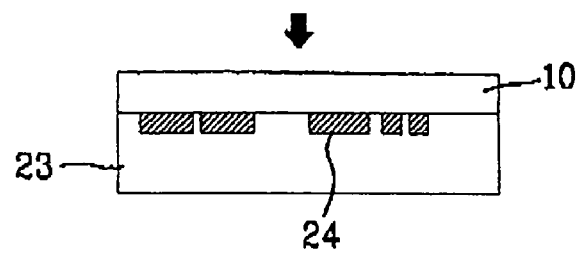
Figure 3C:
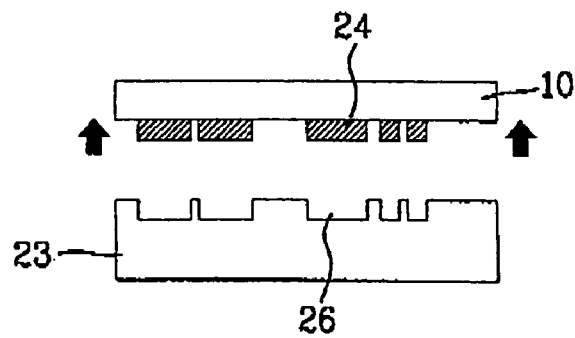
Figure 3D:
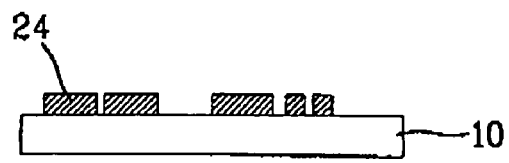
Figure 4:
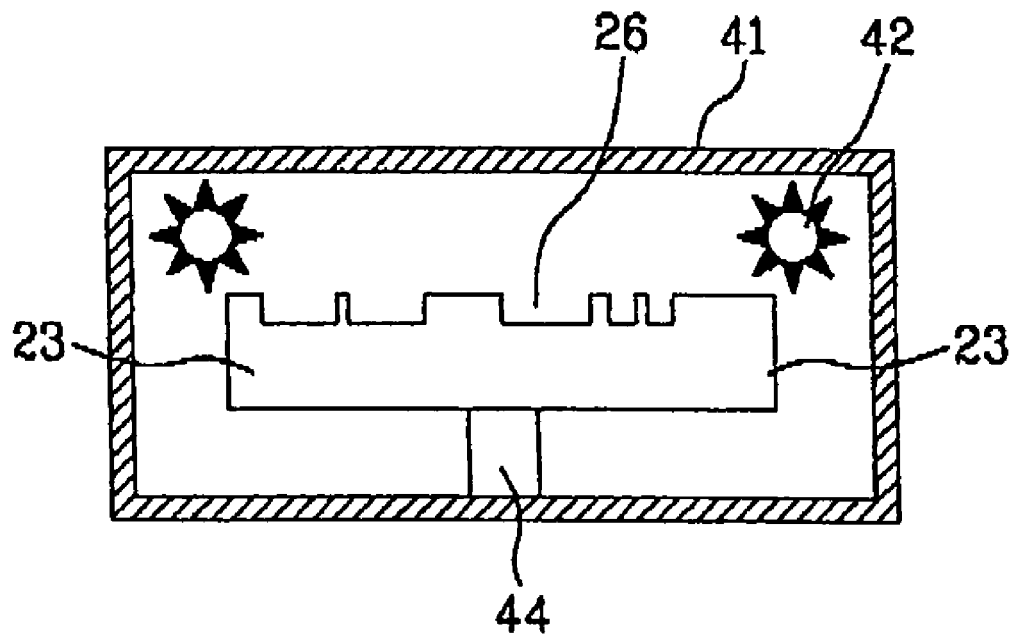
FIG. 4 is cross-sectional view of an exemplary printing device in accordance with the present invention.

FIG. 4 is cross-sectional view of an exemplary printing device in accordance with the present invention. In FIG. 4, the printing device may include clean chamber 41 having a cliché and a UV light source system 42 disposed therein. The clean chamber 41 may include an actuator 44 contacting a bottom portion of the cliché to affect a vertical movement of the cliché within the clean chamber 41. The cliché may include a plurality of grooves 26 formed within an upper portion of the cliché. Although each of the plurality of grooves 26 are shown to have a rectangular geometry, other geometrical shapes such as triangular, semi-circular, and semi-elliptical geometrical shapes may be used. Alternatively, each the plurality of grooves 26 may include any number of different combinations of geometrical shapes such as rectangular and semi-circular geometrical shapes, for example. The UV light source system 42 may function as a cleaning system for removing organic particles that may remain on the cliché after processing, thereby preventing an transfer of contamination.

Figure 5:
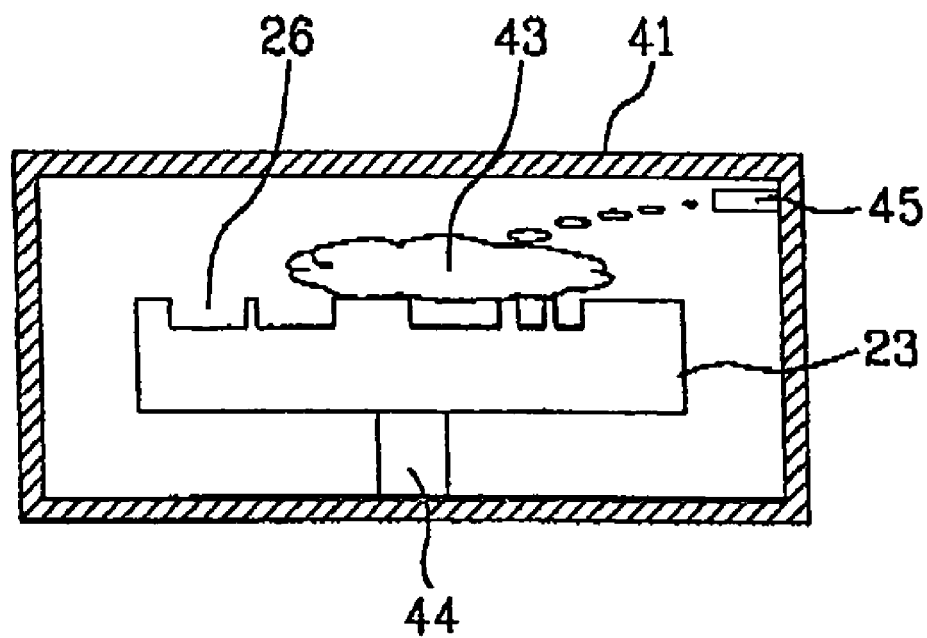
FIG. 5 is a cross-sectional view of another exemplary printing device in accordance with the present invention.

In FIG. 5, in addition to, or instead of the UV light source system 42 (in FIG. 4), a gas inlet system 45 may be provided to further clean the cliché of contaminates. The gas inlet system 45 may supply a single gas or multiple gases 43. For example, the gas inlet system 45 may supply ozone for cleaning of the cliché. Accordingly, the cliché may remain within the clean chamber 41 to prevent contamination within the plurality of grooves 26 as well as on the uppermost surface of the cliché.

Figure 6A:
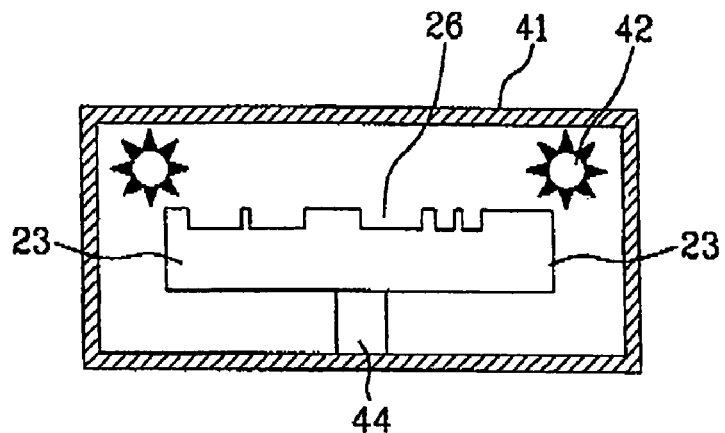

FIGS. 6A to 6E are cross-sectional views of an exemplary sequential printing process of a gravure of offset method in accordance with the present invention. In FIG. 6A, a cliché may be placed at a first position within an interior space of a clean chamber 41, whereby contaminates, such as organic particles, may be removed from a plurality of grooves 26 of the cliché, as well as uppermost surfaces of the cliché using a UV lamp system 42 or a gas inlet system (not shown). A bottom portion of the cliché may be positioned upon the actuator 44. Accordingly, the cliché 23 is cleaned within the interior of the clean chamber 41. Although the clean chamber 41 is shown to have a rectangular shape, any geometrical shape may be used.

Figure 6B:
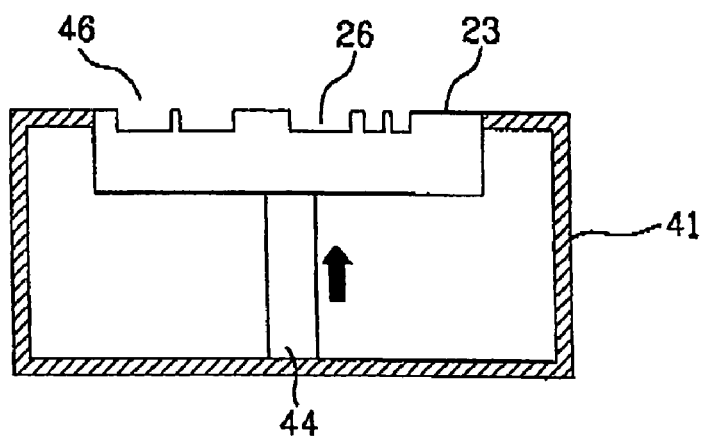

In FIG. 6B, an opening 46 is created at an uppermost portion of the clean chamber 41. The opening 46 may created by using any one of a slideable, hinged, or rotating door, for example. Once the opening 46 has been created, the cliché may be elevated via the actuator 44 to a position within the opening 46. Accordingly, the uppermost surface of the cliché may be planar with an uppermost exterior surface of the clean chamber 41. Alternatively, the uppermost surface of the cliché may extend slightly above, or be recessed slightly below the uppermost exterior surface or the clean chamber 41.

Figure 6C:
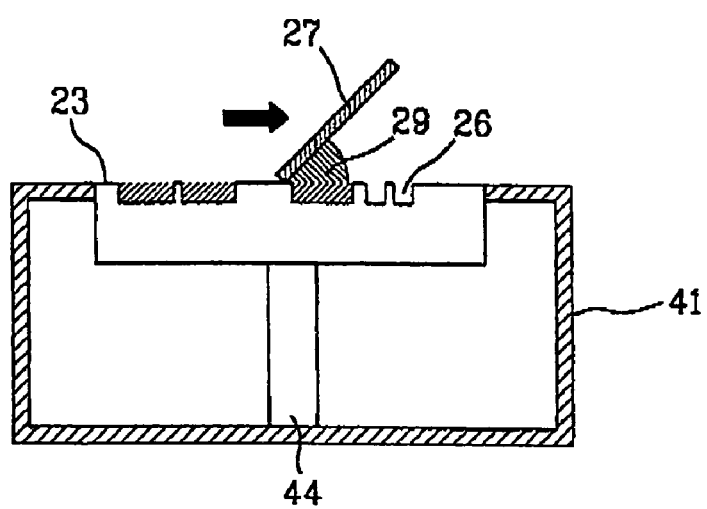

In FIG. 6C, a photoresist or ink material 29 may be filled into a plurality of grooves 26 formed in the uppermost surface of the cliché, wherein the plurality of grooves are spaced apart to define a pattern. Next, any excess photoresist material 29 that remains on the uppermost surface of the cliché may be removed by a doctor blade 27. Accordingly, the photoresist material 29 may only remain in each of the plurality of grooves 26. Alternatively, as previously described, the uppermost surface of the cliché may be recessed below the uppermost exterior surface of the clean chamber 41, wherein the photoresist material may exist within each of the plurality of grooves 26 and along the uppermost surface of the cliché.

Although each of the plurality of grooves 26 are shown to have a rectangular geometry, other geometrical shapes such as triangular, semi-circular, and semi-elliptical geometrical shapes may be used. Alternatively, each the plurality of grooves 26 may include any number of different combinations of geometrical shapes such as rectangular and semi-circular geometrical shapes, for example.

Figure 6D:
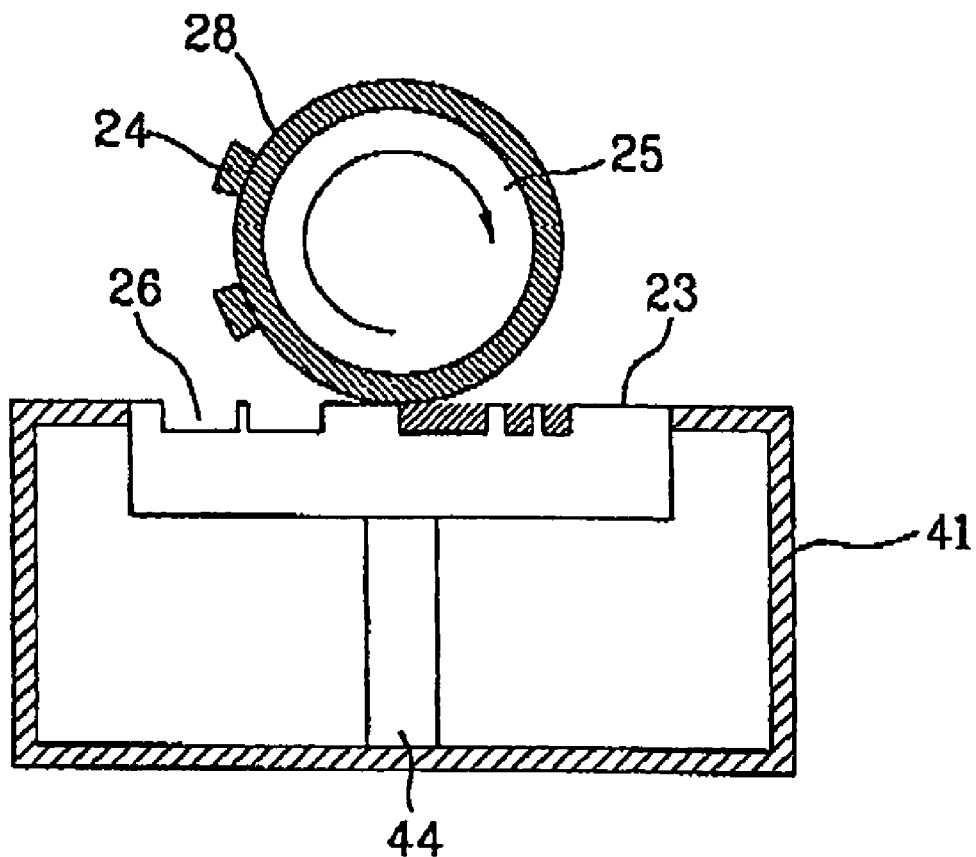

In FIG. 6D, a roller 25 may be rolled across the uppermost surface of the cliché along a first direction so that individual photoresist material portions 24 of the photoresist material 29 (in FIG. 6C) that filled each of the plurality of grooves 26 (in FIG. 6C) are temporarily bonded onto a silicon blanket 28 of the roller 25. Accordingly, the pattern of the photoresist-filled grooves 26 (in FIG. 6C) is transferred onto the silicon blanket 28 as the individual photoresist material portions 24.

When transfer of the individual photoresist pattern portions 24 onto the silicon blanket 28 of the roller 24 is complete, the cliché may be returned to the interior of the clean chamber 41 by the actuator 44, and the roller 25 with the individual photoresist material portions 24 may be relocated to another region for additional processing. Once the cliché has been returned to the interior of the clean chamber 41, the clean chamber 41 may be scaled by closing the opening 46 (in FIG. 6B). Accordingly, once the clean chamber 41 is sealed and the cliché returned to the first position, the cliché may be cleaned using one or both of the UV light source system 42 (in FIG. 6A) and the gas inlet system (not shown).

Figure 6E:
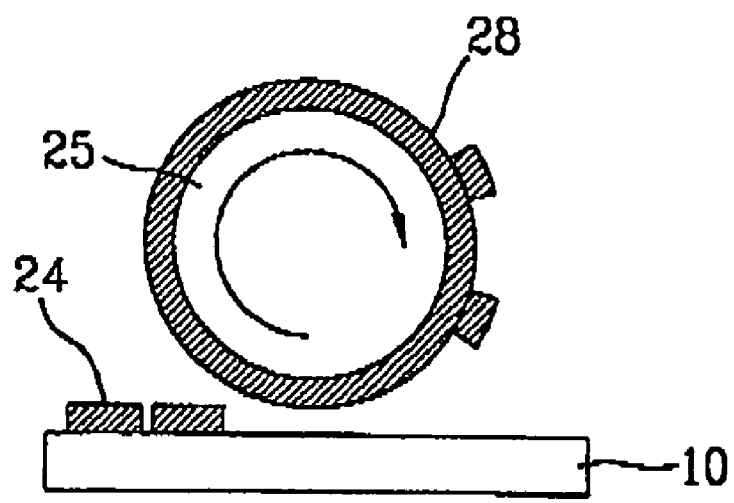
Figure 7A:
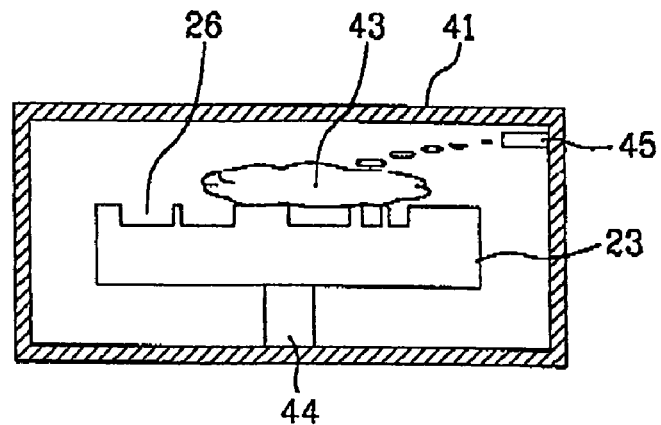
FIGS. 7A to 7E are cross-sectional views of an exemplary sequential printing process of a transfer offset method in accordance with the present invention.

In FIG. 6E, the roller 25 having the individual photoresist material portions 24 attached to the silicon blanket 28 may be positioned above an uppermost surface of a substrate 10. The roller may roll across the uppermost surface of the substrate 10, thereby transferring the individual photoresist material portions 24 from the silicon blanket 28 onto the uppermost surface of the substrate 10. Accordingly, the pattern of the photoresist-filled grooves 26 (in FIG. 6C) is transferred onto the uppermost surface of the substrate 10 as the individual photoresist material portions 24. The substrate 10 and the individual photoresist material portions 24 may subsequently undergo additional processing FIGS. 7A to 7E are cross-sectional views of an exemplary sequential printing process of a transfer offset method in accordance with the present invention. In FIG. 7A, a cliché may be placed at a first position within an interior space of a clean chamber 41, whereby contaminates, such as organic particles, may be removed from a plurality of grooves 26 of the cliché, as well as uppermost surfaces of the cliché using or a gas inlet system 45 or a UV lamp system (not shown). A bottom portion of the cliché may be positioned upon the actuator 44. Accordingly, the cliché is cleaned within the interior of the clean chamber 41. Although the clean chamber 41 is shown to have a rectangular shape, any geometrical shape may be used.

Figure 7B:
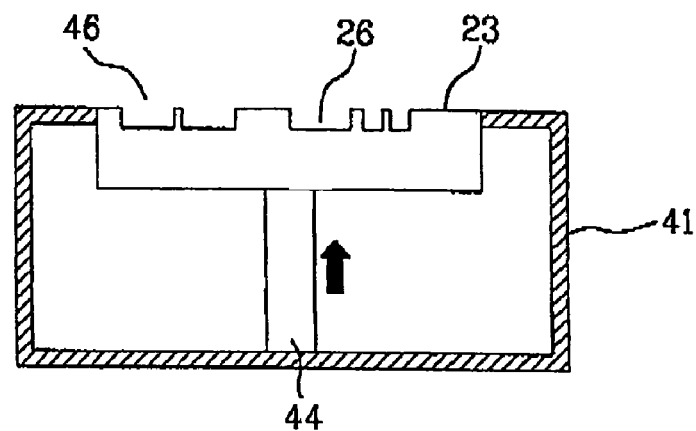

In FIG. 7B, an opening 46 is created at an uppermost portion of the clean chamber 41. The opening 46 may created by using any one of a slideable, hinged, or rotating door, for example. Once the opening 46 has been created, the cliché may be elevated via the actuator 44 to a position within the opening 46. Accordingly, the uppermost surface of the cliché may be planar with an uppermost exterior surface of the clean chamber 41. Alternatively, the uppermost surface of the cliché may extend slightly above, or be recessed slightly below the uppermost exterior surface of the clean chamber 41.

Figure 7C:
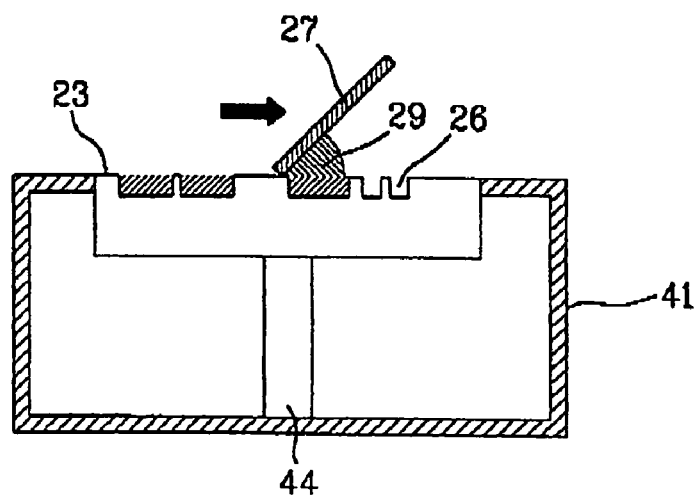

In FIG. 7C, a photoresist or ink material 29 may be filled into a plurality of grooves 26 formed in the uppermost surface of the cliché, wherein the plurality of grooves are spaced apart to define a pattern. Next, any excess photoresist material 29 that remains on the uppermost surface of th cliché may be removed by a doctor blade 27. Accordingly, the photoresist material 29 may only remain in each of the plurality of grooves 26. Alternatively, as previously described, the uppermost surface of the cliché may be recessed below the uppermost exterior surface of the clean chamber 41, wherein the photoresist material may exist within each of the plurality of grooves 26 and along the uppermost surface of the cliché.

Although each of the plurality of grooves 26 are shown to have a rectangular geometry, other geometrical shapes such as triangular, semi-circular, and semi-elliptical geometrical shapes may be used. Alternatively, each the plurality of grooves 26 may include any number of different combinations of geometrical shapes such as rectangular and semi-circular geometrical shapes, for example.

Figure 7D:
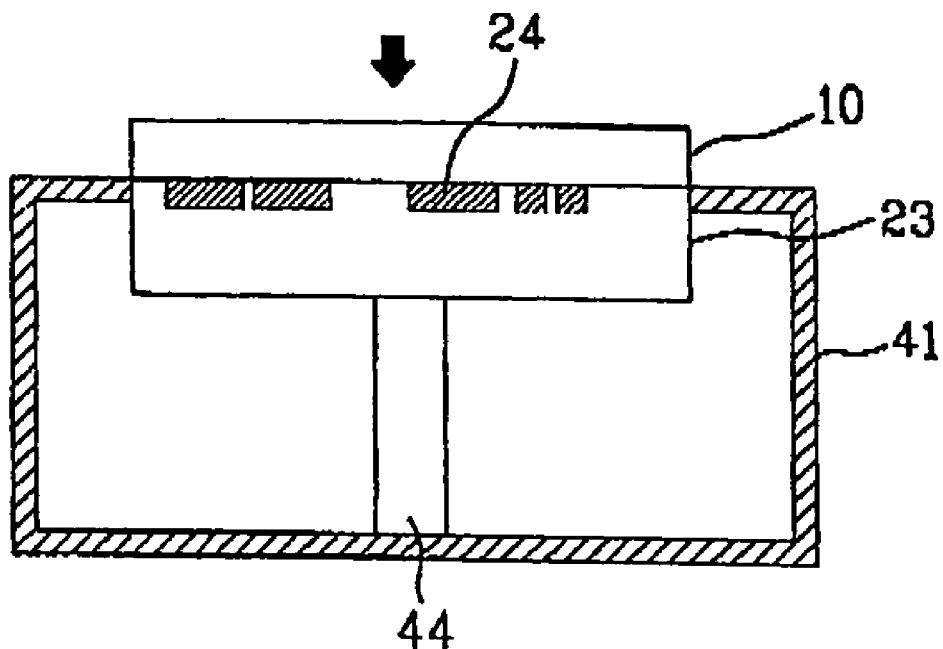

In FIG. 7D, a surface of a substrate 10, which may be formed of a glass or plastic material, may be placed upon the surface of the cliché to contact uppermost surfaces or individual photoresist material portions 24 filled in each of plurality of grooves 26 (in FIG. 7C). Then, heat and/or pressure may be applied to the substrate 10 and cliché to bond each of the individual photoresist material portions 24 onto the surface of the substrate 10. Accordingly, the pattern of the photoresist-filled rectangular grooves 26 (in FIG. 7C) may be transferred onto the surface of the substrate 10 blanket 28 as the individual photoresist material portions 24.

Figure 7E:
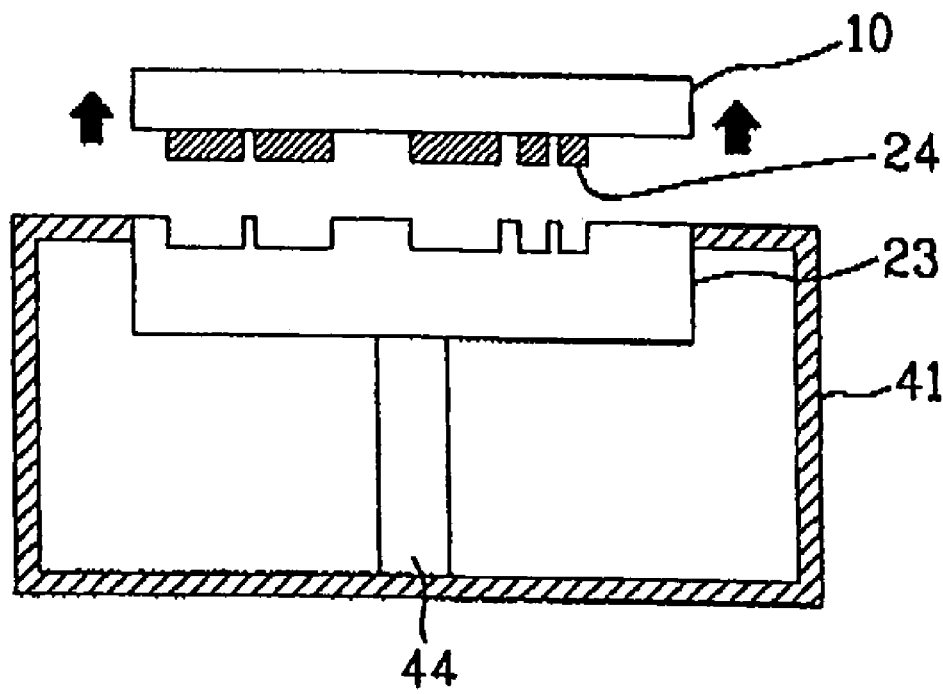

In FIG. 7E, the substrate 10 may be removed from the surface or the cliché along a vertical direction, and the individual photoresist material portions 24 may be transferred from the plurality of grooves 26 (in FIG. 7C) onto the surface of the substrate 10, thereby completing the printing process for forming the pattern of the individual photoresist material portions 24. Next, the substrate 10 may delivered to a position in which the individual photoresist material portions 24 are prepared for additional processing.

When transfer of the individual photoresist pattern portions 24 onto the surface of the substrate 10 is complete, the cliché may be returned to the interior of the clean chamber 41 by the actuator 44. Once the cliché has been returned to the interior of the clean chamber 41, the clean chamber 41 may be sealed by closing the opening 46 (in FIG. 7B). Accordingly, once the clean chamber 41 is sealed and the cliché returned to the first position, the cliché may be cleaned using one or both of the gas inlet system 48 (in FIG. 7A) of the UV light source system (not shown).

Accordingly, the cliché may be kept within the interior of the clean chamber 41 once transfer of the individual photoresist material portions 24 is completed, whereby contaminates are prevented from being introduced onto surfaces of the cliché. In addition, the cliché may undergo cleaning after each printing process is completed.

It will be apparent to those skilled in the art that various modifications and variations can be made in the printing device and method for fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A printing system for printing a pattern onto a liquid crystal display device, comprising:
    a cliche having a plurality of grooves defining a pattern;
    a blade for filling a material into each of the plurality of grooves of the cliche;
    a clean chamber for cleaning the cliche; and
    an actuator disposed within an interior of the clean chamber upon which the cliche is placed,
    wherein the actuator extends the cliche from a first position wholly within the clean chamber to a second position exposing an upper surface of the cliche at an exterior of the clean chamber.

2. The system according to claim 1, further including a roller for transferring the material filled in each of the plurality of grooves of the cliche onto a surface of a substrate.

3. The system according to claim 1, further including a UV light source system disposed within an interior of the clean chamber for cleaning the cliche.

4. The system according to claim 1, wherein the clean chamber includes a gas inlet system.

5. The system according to claim 4, wherein the gas inlet system provides ozone gas into an interior of the clean chamber.

* * * * *